(12) United States Patent
Kanazawa et al.

(10) Patent No.: US 11,366,034 B2
(45) Date of Patent: Jun. 21, 2022

(54) PRESSURE/TEMPERATURE SENSOR WITH REDUCED PRESSURE LOSS

(71) Applicant: DENSO CORPORATION, Kariya (JP)

(72) Inventors: Takeru Kanazawa, Kariya (JP); Ryosuke Murayama, Kariya (JP); Yoichi Okui, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/133,726

(22) Filed: Dec. 24, 2020

(65) Prior Publication Data

US 2021/0116319 A1    Apr. 22, 2021

Related U.S. Application Data

(63) Continuation of application No. PCT/JP2019/023463, filed on Jun. 13, 2019.

(30) Foreign Application Priority Data

Jul. 19, 2018  (JP) .............................. JP2018-135706

(51) Int. Cl.
  *G01L 19/00*  (2006.01)
  *G01K 7/16*   (2006.01)
  *G01L 9/06*   (2006.01)

(52) U.S. Cl.
  CPC ............ *G01L 19/0092* (2013.01); *G01K 7/16* (2013.01); *G01L 9/06* (2013.01)

(58) Field of Classification Search
  None
  See application file for complete search history.

(56) References Cited

U.S. PATENT DOCUMENTS

| | | | | |
|---|---|---|---|---|
| 5,080,496 | A * | 1/1992 | Keim | F02C 9/28 |
| | | | | 374/144 |
| 2008/0216580 | A1* | 9/2008 | Kuznia | G01L 19/0092 |
| | | | | 73/714 |
| 2009/0178487 | A1* | 7/2009 | Girroir | G01L 19/0092 |
| | | | | 73/716 |
| 2009/0323760 | A1* | 12/2009 | Gebauer | G01K 13/02 |
| | | | | 374/143 |

(Continued)

FOREIGN PATENT DOCUMENTS

DE    102008032309 A1    1/2010

*Primary Examiner* — Lisa M Caputo
*Assistant Examiner* — Nigel H Plumb
(74) *Attorney, Agent, or Firm* — Posz Law Group, PLC

(57) ABSTRACT

In a pressure/temperature sensor, a sensor circuit is held by a holding member inside a tube that is fixed to a pipe, and an introduction portion is provided in the holding member at an inner side of the pipe with respect to the sensor circuit. The introduction portion includes a plurality of blades having blade surfaces extending along a protrusion direction of the introduction portion with respect to the sensor circuit. The plurality of blades are arranged radially on a surface perpendicular to the protrusion direction, and angles defined by the blade surfaces of the adjacent blades are all acute angles. Thus, regardless of the angle at which the blade is attached with respect to the flow direction of the measuring medium, an acute-angled portion of any adjacent blades is directed to the flow direction of the measuring medium. Therefore, a pressure loss of the measuring medium can be reduced.

11 Claims, 7 Drawing Sheets

(56) References Cited

U.S. PATENT DOCUMENTS

2014/0341255 A1* 11/2014 Kaiser ................ G01L 19/0084
                                                           374/143
2018/0031427 A1*  2/2018 Fujisawa .................. G01K 1/14

* cited by examiner

II-II CROSS SECTION

PRESSURE/TEMPERATURE SENSOR WITH REDUCED PRESSURE LOSS

CROSS REFERENCE TO RELATED APPLICATION

The present application is a continuation application of International Patent Application No. PCT/JP2019/023463 filed on Jun. 13, 2019, which designated the U.S. and claims the benefit of priority from Japanese Patent Application No. 2018-135706 filed on Jul. 19, 2018. The entire disclosures of all of the above applications are incorporated herein by reference.

TECHNICAL FIELD

The present disclosure relates to a pressure/temperature sensor configured to detect a pressure and a temperature of a measuring medium.

BACKGROUND

Conventionally, a sensor for detecting a pressure and a temperature of a measuring medium has been proposed. The sensor includes a diffuser protruding from a tubular port, and the diffuser includes four blades extending along a longitudinal direction of the tubular port. The four blades are arranged at equal angles in a circumferential direction around an axis of the tubular port along the longitudinal direction.

SUMMARY

A pressure/temperature sensor according to an aspect of the present disclosure includes a holding member having a tube, and configured to hold a sensor circuit to be positioned inside the tube and to fix the sensor circuit to a pipe to which the tube is attached.

Furthermore, the pressure/temperature sensor includes an introduction portion provided in the holding member to be positioned at an inner side of the pipe with respect to the sensor circuit.

The introduction portion includes a plurality of blades having blade surfaces extending along a protrusion direction of the introduction portion with respect to the sensor circuit. The plurality of blades are arranged radially on a perpendicular surface perpendicular to the protrusion direction, and angles defined by the blade surfaces of the adjacent blades are all acute angles.

Accordingly, regardless of the angle at which the blade is attached with respect to the flow direction of the measuring medium, an acute-angled portion of any adjacent blades can be directed to the flow direction of the measuring medium.

BRIEF DESCRIPTION OF THE DRAWINGS

The above and other objects, features and advantages of the present disclosure will be more clearly understood from the following detailed description with reference to the accompanying drawings. In the accompanying drawings.

DESCRIPTION OF EMBODIMENTS

Figure 1:
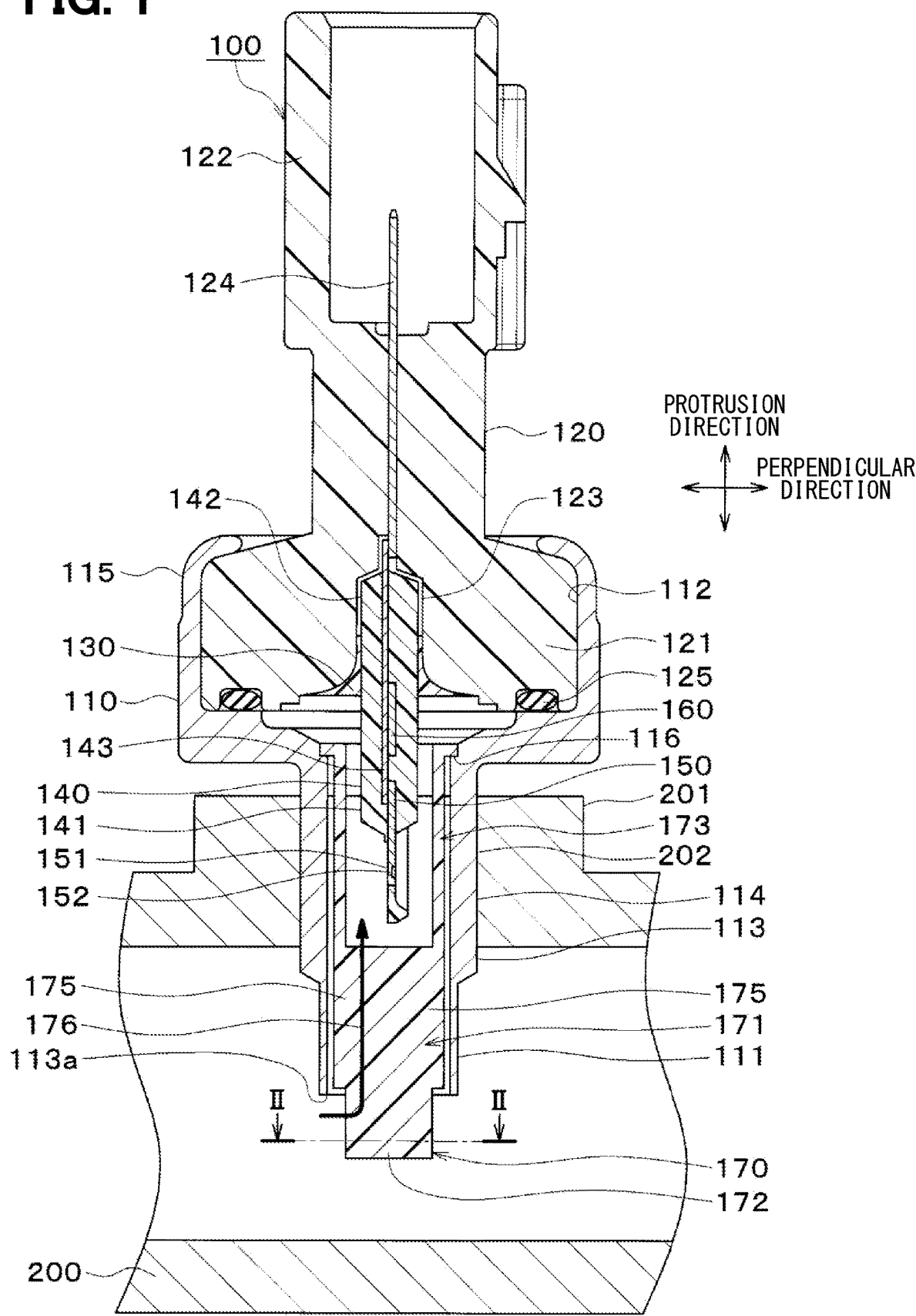
FIG. 1 is a sectional view of a pressure/temperature sensor according to a first embodiment.

When four blades are arranged at equal angles in a circumferential direction around an axis of a tubular port, the angle between the adjacent blades is 90 degrees. In this case, it may be difficult to know at what angle each blade of the diffuser is attached with respect to a flow direction of the measuring medium until the sensor is attached to an attachment target.

For example, when the sensor is fixed to a mounting target with the blades tilted by 45 degrees with respect to the flow direction of the measuring medium, the measuring medium tends to gather at a corner portion made of adjacent two blades. In this case, the measuring medium may be easily drawn into the tubular port along the blade surface of the blade. Therefore, the drawn amount of the measuring medium can be maximized.

On the other hand, in a state where the two blades are tilted by 90 degrees with respect to the flow direction of the measuring medium, the two blades face the flow of the measuring medium. Therefore, a part of the measuring medium that collides with the blade surface is drawn into the tubular port, but the other part takes a route that bypasses the diffuser. In this case, the drawing amount of the measuring medium is reduced. As a result, a temperature detection accuracy of the sensor may decrease.

Further, since the blade surfaces of the two blades block a part of the flow of the measuring medium, a pressure difference occurs before and after the flow of the measuring medium in the diffuser. As a result, pressure loss may occur in the measuring medium.

As described above, when the sensor has four blades, the amount of the measuring medium drawn into the tubular port varies depending on the direction of each blade with respect to the flow of the measuring medium. Of course, the same causes to the case of three blades.

In view of the above points, it is an object of the present disclosure to provide a pressure/temperature sensor that can reduce the pressure loss of the measuring medium while ensuring the drawing amount of the measuring medium, regardless of the angle at which the blades are attached with respect to the flow direction of the measuring medium.

In order to achieve the above object, a pressure/temperature sensor according to an aspect of the present disclosure includes a sensor circuit having a pressure detection unit configured to detect a pressure of a measuring medium and a temperature detection unit configured to detect a temperature of the measuring medium.

The pressure/temperature sensor includes a holding member having a tube, and configured to hold the sensor circuit to be positioned inside the tube and to fix the sensor circuit to a pipe to which the tube is attached.

Furthermore, the pressure/temperature sensor includes an introduction portion provided in the holding member to be positioned at an inner side of the pipe with respect to the sensor circuit, and arranged inside the pipe when the tube is fixed to the pipe.

The introduction portion includes a plurality of blades having blade surfaces extending along a protrusion direction of the introduction portion with respect to the sensor circuit. The plurality of blades are arranged radially on a perpendicular surface perpendicular to the protrusion direction, and angles defined by the blade surfaces of the adjacent blades are all acute angles.

Accordingly, regardless of the angle at which the blade is attached with respect to the flow direction of the measuring medium, an acute-angled portion of any adjacent blades is directed to the flow direction of the measuring medium. Therefore, the measuring medium can be effectively drawn into the tube along the blade surface from the acute-angled portion of the adjacent blades. Thus, the drawn amount of the measuring medium can be secured.

Further, regardless of the angle at which each blade is attached with respect to the flow direction of the measuring medium, the projected area of the blade surfaces on a surface perpendicular to the flow direction of the measuring medium is made smaller than that of four or less blades. Because the flow of the measuring medium is less likely to be obstructed by the blade surface than a case where the number of blades is four or less, a pressure difference is less likely to occur before and after the introduction portion in the flow of the measuring medium. Therefore, a pressure loss of the measuring medium can be reduced.

Hereinafter, embodiments for implementing the present disclosure will be described referring to drawings. In the respective embodiments, parts corresponding to matters already described in the preceding embodiments are given reference numbers identical to reference numbers of the matters already described. The same description is therefore omitted depending on circumstances. In a case where only a part of the configuration is described in each embodiment, the other embodiments described above can be applied to the other part of the configuration. The present disclosure is not limited to combinations of embodiments which combine parts that are explicitly described as being combinable. As long as no problem is present, the various embodiments may be partially combined with each other even if not explicitly described.

First Embodiment

A first embodiment will be described with reference to the drawings. A pressure/temperature sensor according to the present embodiment is configured to be capable of detecting both a pressure and a temperature of a measuring medium. The pressure/temperature sensor is fixed to a pipe and detects the pressure and temperature of the measuring medium in the pipe. The measuring medium is, for example, a refrigerant used in automobiles. Other measuring media may include a lubricating oil such as engine oil and transmission oil, gas, and the like, for example.

As shown in FIG. 1, a pressure/temperature sensor 100 includes a housing 110, a sensor body 120, a potting part 130, a molded resin portion 140, a sensor chip 150 and an instruction portion 170.

The housing 110 is a hollow case processed with a metal material such as SUS by cutting or the like. The housing 110 has a protrusion portion 111 on one end side and an opening 112 on the other end side. The protrusion portion 111 has a tube 113. The tube 113 communicates with the opening 112. On an outer peripheral surface of the tube 113, a male screw portion 114 is formed to be screwed into a pipe 200 that is an attachment subject to be attached.

The opening 112 of the housing 110 is configured to be surrounded by a peripheral wall 115. The housing 110 is fixed to a through screw hole 202 provided in a thick portion 201 of the pipe 200 to which a part of the tube 113 is attached. As a result, an open end portion 113a of the tube 113 is located inside the pipe 200.

A method of fixing the pressure/temperature sensor 100 to the pipe 200 is not limited to the screw fastening described above. For example, a method such as a flange fixing or a circlip may be adopted.

The sensor body 120 is a component that constitutes a connector for electrically connecting the pressure/temperature sensor 100 and an external device. The sensor body 120 is made of a resin material such as PPS. One end of the sensor body 120 is formed as a fixing portion 121 fixed to the opening 112 of the housing 110, and the other end of the sensor body 120 is formed as a connector portion 122. The fixing portion 121 has a recess 123 recessed to a side of the connector portion 122.

Further, in the sensor body 120, a terminal 124 is insert-molded. The terminal 124 is insert-molded in the sensor body 120, such that one end of the terminal 124 is sealed in the fixing portion 121, and the other end of the terminal 124 is exposed inside the connector portion 122. The one end of the terminal 124 is connected to an electrical component of the molded resin portion 140 by accommodating a part of the molded resin portion 140 in the recess 123.

Further, the sensor body 120 is caulk-fixed in such a manner that the end part of the peripheral wall 115 of the housing 110 presses the fixing part 121 in a state where the fixing part 121 is fitted into the opening 112 of the housing 110 through an O-ring 125.

A potting part 130 is a sealing member filled in the gap between the recess 123 of the sensor body 120 and the molded resin portion 140. The potting part 130 is made of a resin material such as an epoxy resin. The potting part 130 seals and protects a part of the molded resin portion 140, a joint portion of the terminal 124, and the like, from the oil which is the measuring medium.

The molded resin portion 140 is a member that holds the sensor chip 150. The molded resin portion 140 is formed in a columnar shape having one end portion 141 and the other end portion 142 on the opposite side of the one end portion 141. The molded resin port 140 seals the one end portion 141 of the sensor chip 150.

Further, the molded resin portion 140 seals a part of a lead frame 143 and a circuit chip 160. The lead frame 143 is a base member on which the sensor chip 150 and the circuit chip 160 are mounted. The sensor chip 150 is mounted on one end side of the lead frame 143, and the circuit chip 160 is mounted on the other end side of the lead frame 143.

A tip end portion of the lead frame 143 on the other end side is exposed from the other end portion 142 of the molded resin portion 140 and is connected to the one end of the terminal 124. The lead frame 143 may be divided into a plurality of parts. In this case, the electrical connection may be made by a bonding wire. The lead frame 143 and the terminal 124 may also be connected by bonding wires.

The circuit chip 160 is an IC chip on which a semiconductor integrated circuit such as a memory is formed. The circuit chip 160 is formed by using a semiconductor substrate or the like. The circuit chip 160 supplies a constant current as a power source to the sensor chip 150, inputs a pressure signal and a temperature signal from the sensor chip 150, and performs signal processing of each signal based on a preset signal processing value. The signal processing value is an adjustment value for amplifying or calculating the signal value of each signal. The circuit chip 160 is electrically connected to the sensor chip 150 via the lead frame 143 by a bonding wire (not shown).

The sensor chip 150 is an electronic component that detects the temperature of the measuring medium. The sensor chip 150 is mounted on the lead frame 143 with, for example, silver paste. The sensor chip 150 is configured to have a plate-shaped substrate formed by laminating a plurality of layers. The plurality of layers are laminated as a wafer level package, processed by a semiconductor process or the like, and then diced and cut for each sensor chip 150.

The sensor chip 150 has a thin-walled diaphragm 151. A plurality of piezoresistive elements 152 are formed on the diaphragm 151. Each piezoresistive element 152 is a diffusion resistor formed by ion implantation into a semiconductor layer. Each piezoresistive element 152 may be configured as a thin film resistor formed on the diaphragm 151. The sensor chip 150 is also formed with wiring portions, pads, and the like (not shown) connected to the piezoresistive elements 152.

Each piezoresistive element 152 is a resistance element whose resistance value changes according to the strain of the diaphragm 151 to which the pressure of the measuring medium is applied. Further, each piezoresistive element 152 is an element whose resistance value changes according to the temperature of the measuring medium. Each piezoresistive element 152 is electrically connected to configure a Wheatstone bridge circuit. The Wheatstone bridge circuit is supplied with constant current power from the circuit chip 160. Thereby, the piezoresistive effect of each piezoresistive element 152 can be utilized to detect a voltage corresponding to a deformation or a temperature of the diaphragm 151.

Specifically, the sensor chip 150 detects a change in the resistance of the plurality of piezoresistive elements 152 in response to the deformation of the diaphragm 151 as a change in the midpoint voltage of the Wheatstone bridge circuit, and outputs the midpoint voltage as a pressure signal. On the other hand, the sensor chip 150 detects the resistance change of the plurality of piezoresistive elements 152 according to the heat received from the measuring medium as the bridge voltage of the Wheatstone bridge circuit, and outputs the bridge voltage as a temperature signal.

Therefore, in the present embodiment, each piezoresistive element 152 has the functions of both a pressure detection unit and a temperature detection unit. The sensor chip 150 is sealed at the one end portion 141 of the molded resin portion 140 such that the portions corresponding to the pressure detection unit and the temperature detection unit are exposed.

The molded resin portion 140 is held by the sensor body 120 and the potting part 130 so that the pressure detection unit and the temperature detection unit of the sensor chip 150 are located inside the tube 113.

Figure 2:
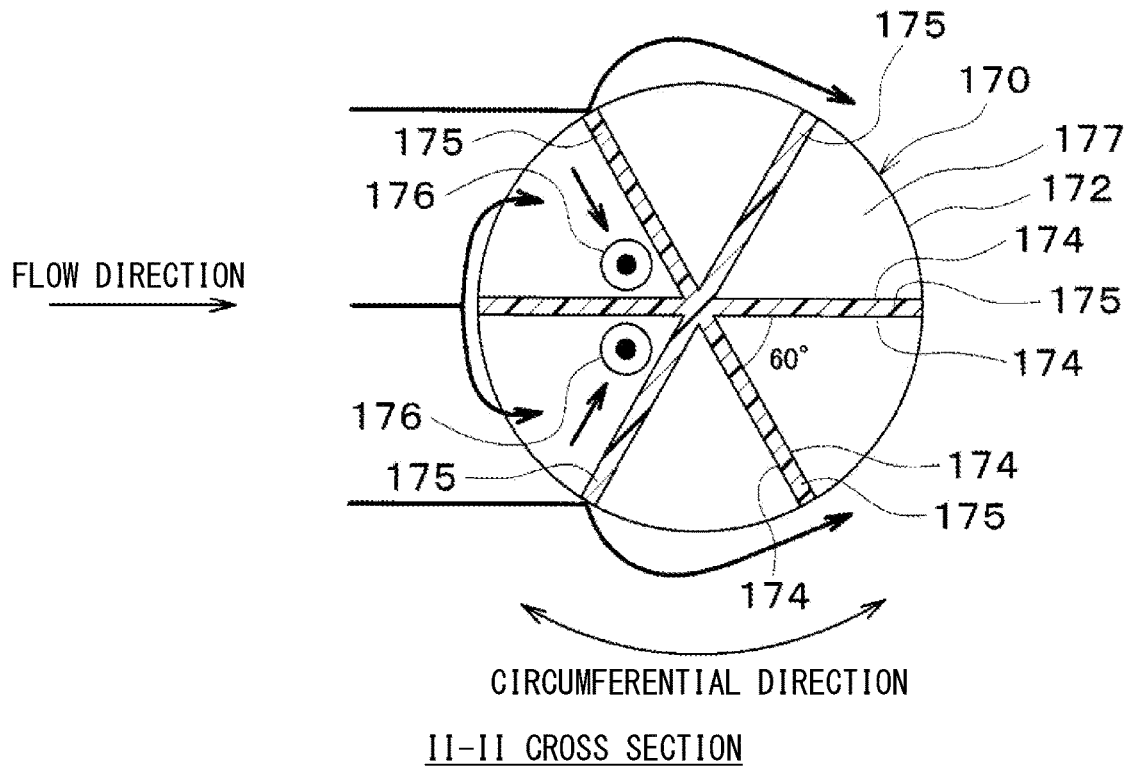
FIG. 2 is a cross-sectional view taken along a line II-II in FIG. 1.

The introduction portion 170 is a member provided in the tube 113 so as to be located adjacent to the molded resin portion 140 in the protrusion direction of the protrusion portion 111. In other words, the introduction portion 170 is provided in the tube 113 so as to be located on the inner side of the pipe 200 with respect to the sensor chip 150. The protrusion direction of the protrusion portion 111 is the same as the arrangement direction of the molded resin portion 140 or the sensor chip 150 and the introduction portion 170. The introduction portion 170 is arranged inside the pipe 200 by fixing the tube 113 to the pipe 200. A part of the introduction portion 170 protrudes from the open end portion 113a of the tube 113. As shown in FIGS. 1 and 2, the introduction portion 170 has a blade portion 171, a bottom 172, and an arm 173.

The blade portion 171 has a plurality of blades 175 having a flat blade surface 174. The blade surface 174 is a surface along the protrusion direction. The blade surface 174 along the protrusion direction includes not only a surface parallel to the protrusion direction but also a surface inclined with respect to the protrusion direction. The blade portion 171 is configured to form a flow passage 176 that guides the measuring medium to flow along the blade surface 174 toward the sensor chip 150.

As shown in FIG. 2, the plurality of blades 175 are arranged radially on a perpendicular surface perpendicular to the protrusion direction, and the blade surfaces 174 are perpendicular to the perpendicular surface. In this embodiment, six blades 175 are arranged at equal angles with an interval of 60 degrees. Further, the angle formed by the blade surfaces 174 of the adjacent blades 175 is all acute angle.

The bottom 172 fixes the plurality of blades 175 on a side opposite to the molded resin portion 140 in the protrusion direction. The bottom 172 has a fixing surface 177 for fixing each blade 175.

The arm 173 is a portion for holding the introduction portion 170 inside the tube 113. One end of the arm 173 is integrated with the blade portion 171. The other end of the arm 173 extends until it reaches the sensor body 120, and is provided with a hook structure. The hook structure is, for example, a snap fit. Then, as shown in FIG. 1, the other end of the arm 173 is hooked at a step portion 116 formed inside the tube 113. As a result, the introduction portion 170 is held inside the tube 113 while a part of the introduction portion 170 including the bottom 172 protrudes from the tube 113. The above is the overall configuration of the pressure/temperature sensor 100.

Next, the action and effect of a configuration in which the angles formed by the blade surfaces 174 of the adjacent blades 175 are all acute angles will be described. First, as shown in FIG. 2, since the angle defined by the blade surfaces 174 of the adjacent blades 175 is an acute angle, any acute angle portion of the blades 175 is oriented in the flow direction of the measuring medium even when the blades 175 are attached at any angle with respect to the flow direction of the measuring medium. Therefore, the measuring medium is collected at the acute angle portion oriented in the flow direction of the measurement medium. Then, the measuring medium collected at the acute angle portion is drawn toward the sensor chip 150 along the blade surfaces 174 of the blades 175. As a result, the flow velocity of the measuring medium is improved in the vicinity of the detection unit of the sensor chip 150, and the temperature detection accuracy and the temperature sensibility are improved.

Figure 3:
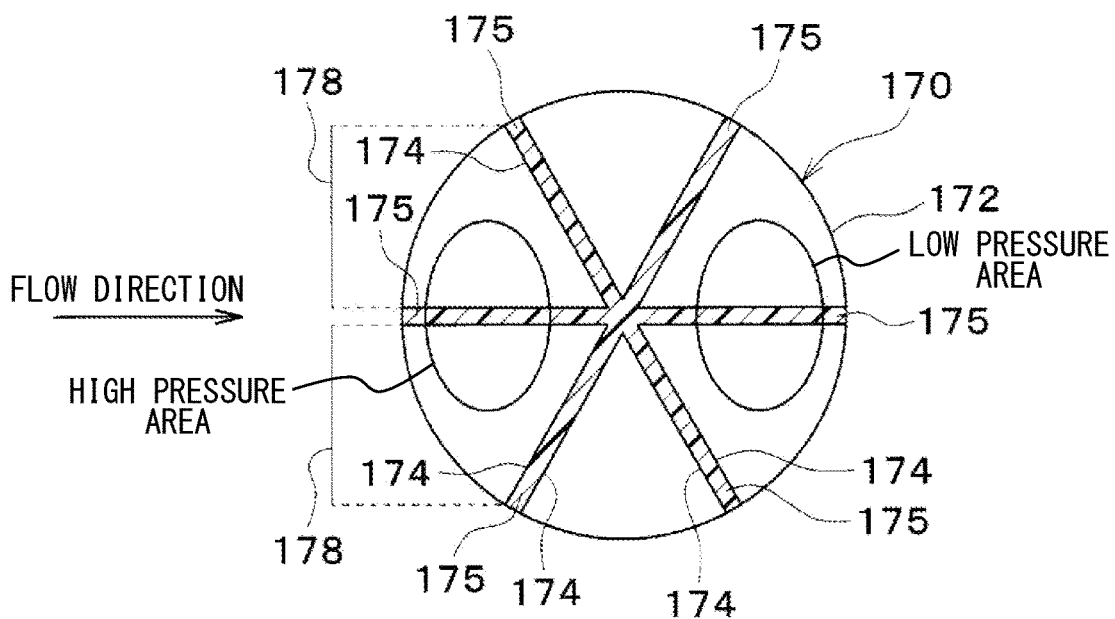
FIG. 3 is a cross-sectional view showing pressure areas generated at an upstream side and a downstream side of an introduction portion.

Further, as shown in FIG. 3, a projected area of the blade surfaces 174 on a surface 178 perpendicular to the flow direction of the measuring medium is smaller than a case where the blade surface 174 is oriented perpendicular to the flow direction of the measuring medium. For this reason, the high-pressure area on the upstream side of the introduction portion 170 in the flow direction of the measuring medium and the low-pressure area on the downstream side in the flow direction of the measuring medium become smaller as compared with a case where the blade surface 174 is oriented perpendicular to the flow direction of the measuring medium. That is, the pressure difference between the upstream side and the downstream side of the introduction portion 170 becomes small. As a result, the pressure loss of the measuring medium is reduced. Since FIG. 3 is a cross-sectional view, the surface 178 is represented as a two-dimensional line.

The inventors of the present disclosure investigated the pressure loss of the measuring medium in the pipe 200 when the number of blades 175 are changed. A plurality of pressure temperature sensors 100 were prepared for each number of blades 175 so that the blade surfaces 174 of the blades 175 were randomly oriented with respect to the flow direction of the measuring medium.

Figure 4:
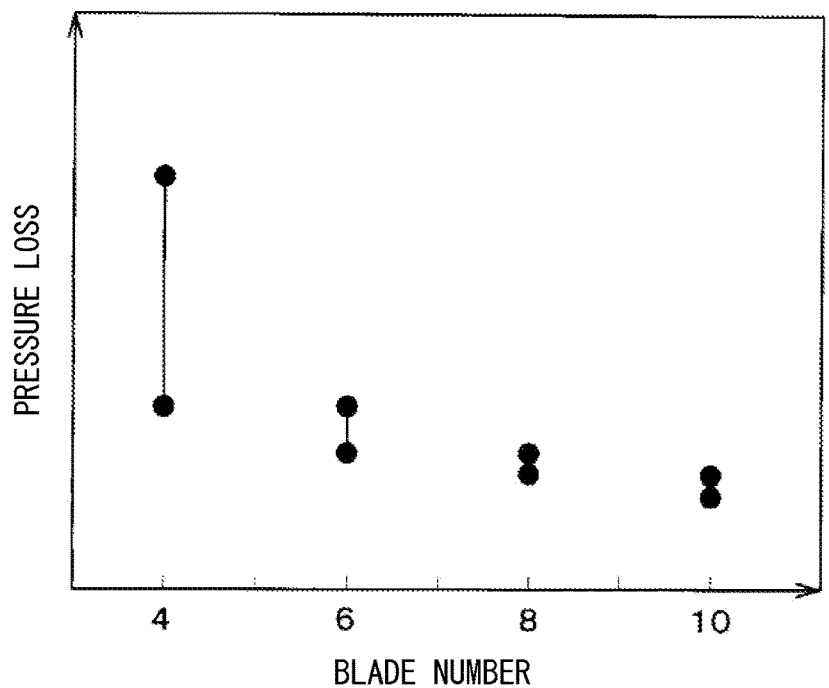
FIG. 4 is a diagram showing a relationship between the number of blades and a pressure loss.

As shown in FIG. 4, when the number of blades 175 is four, the difference between the maximum value and the minimum value of the pressure loss of the measuring medium becomes large. That is, the variation in the pressure loss of the measuring medium became large. This means that the orientation of the blade surface 174 of the blade 175 with respect to the flow direction of the measuring medium varies. When the number of blades 175 is 6, 8, and 10, the pressure loss of the measuring medium becomes smaller than that when the number of blades 175 is 4. In addition, in this case, the variation in pressure loss of the measuring medium is reduced. From this result, the number of blades 175 may be preferably 8 or 10.

As described above, five or more blades 175 are required in order for the angles formed by the adjacent blades 175 to be acute. If the introduction portion 170 has at least five or more blades 175, the pressure loss of the measuring medium is reduced, and the variation in pressure loss is also reduced. From the result of FIG. 4, the pressure loss of the measuring medium is reduced by increasing the number of blades 175 from 4 to 6. Thus, it is possible to reduce the pressure loss of the measuring medium by providing the introduction portion 170 with 5 or more blades 175.

Figure 5:
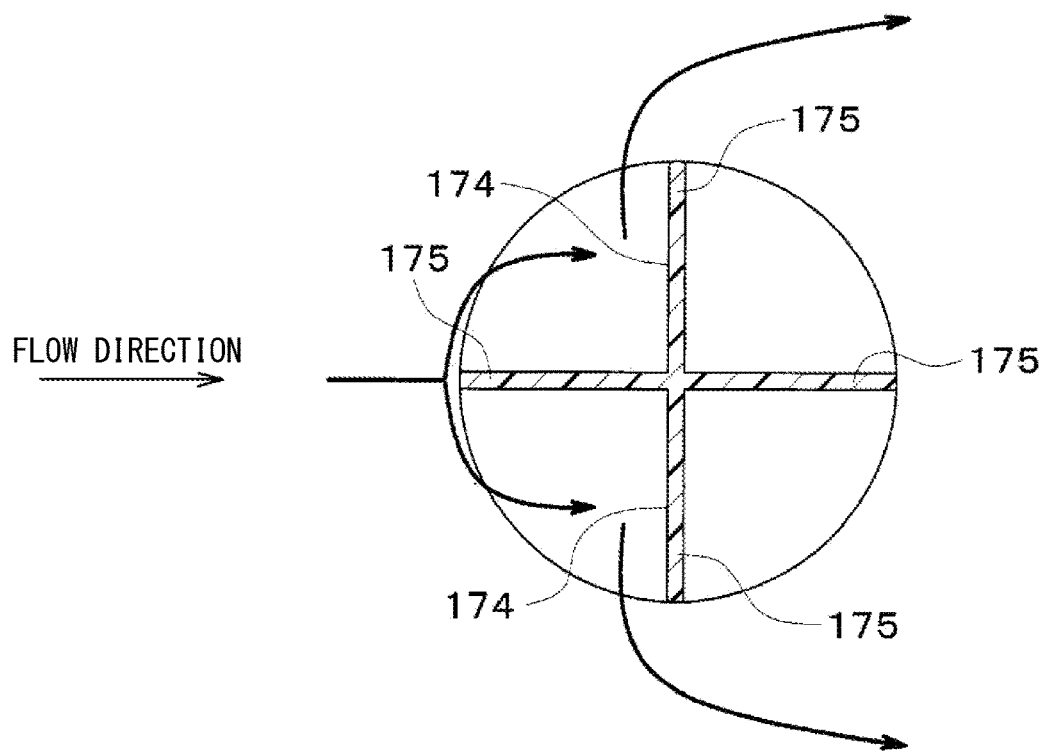
FIG. 5 is a cross-sectional view showing a flow of a measuring medium in a case of four blades as a comparative example.
Figure 6:
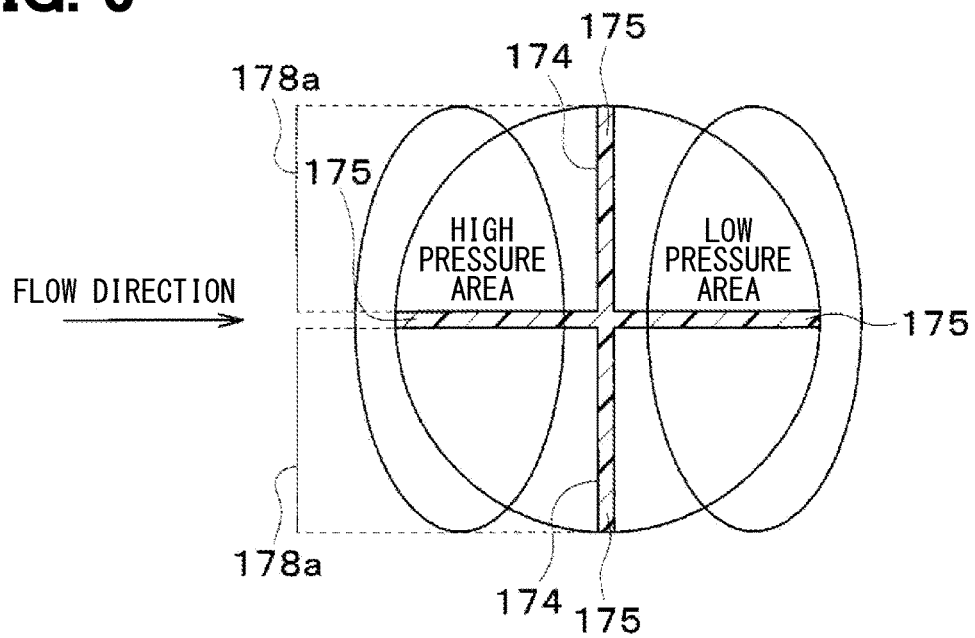
FIG. 6 is a cross-sectional view showing pressure areas generated at an upstream side and a downstream side of an introduction portion in the case of four blades as the comparative example.

As a comparative example, when four blades 175 are provided as shown in FIG. 5, the angles formed by the adjacent blades 175 are at the right angle or an obtuse angles. Then, for example, when the blade surface 174 of the blade 175 is arranged perpendicularly to the flow direction of the measuring medium, the measuring medium colliding with the blade surface 174 of the blade 175 escapes to the outside by the flow around the introduction portion 170. That is, the measuring medium bypasses the introduction unit 170. Therefore, it is difficult to secure the drawing amount of the measuring medium. Further, as shown in FIG. 6, since the projected area of the blade surface 174 projected on the surface 178a perpendicular to the flow direction of the measuring medium is maximized, the entire blade surface 174 blocks the flow of the measuring medium. Thus, a large pressure difference is generated between the upstream side and the downstream side of the introduction portion 170. Thus, the pressure loss of the measuring medium becomes large.

In contrast, in the present embodiment, regardless of the angle at which each blade 175 is attached with respect to the flow direction of the measuring medium, the acute-angled portion of any adjacent blades 175 is directed to the flow direction of the measuring medium. Therefore, the measuring medium can be effectively drawn into the tube 113 along the blade surface 174 from the acute-angled portion of the adjacent blades 175. Thus, the drawn amount of the measuring medium can be secured.

Further, because the projected area of the blade surface 174 on the surface perpendicular to the flow direction of the measuring medium is smaller than that of the case of four or less blades 175, the flow of the measuring medium is less likely disturbed by the introduction portion 170 as compared with the case of four or less blades 175. Therefore, it is possible to restrict a pressure difference from being generated before and after the introduction portion 170 in the flow of the measuring medium. Thus, a pressure loss of the measuring medium can be reduced.

The sensor chip 150 of this embodiment corresponds to a sensor circuit, and the piezoresistive element 152 corresponds to a pressure detection unit and the temperature detection unit. Further, the housing 110, the sensor body 120, and the potting portion 130 correspond to a holding member.

As a modification, the introduction portion 170 does not have to include the bottom 172. Further, in the vertical direction, one ends of respective blades 175 on a central side of the bottom 172 may be separated from each other so that the blades 175 may not be connected to each other. That is, the introduction portion 170 may be provided with a hole corresponding to a space due to the structure in which the blades 175 are not joined. The hole defines a flow path through which the measuring medium passes along the perpendicular direction. As a result, the measuring medium passes through the holes, so that a pressure loss of the measuring medium can be further reduced.

As a modification, the planar shape of the introduction portion 170 in the perpendicular direction may be a polygon such as a quadrangle instead of a circle. The planar shape of the bottom 172 is the same.

Figure 7:
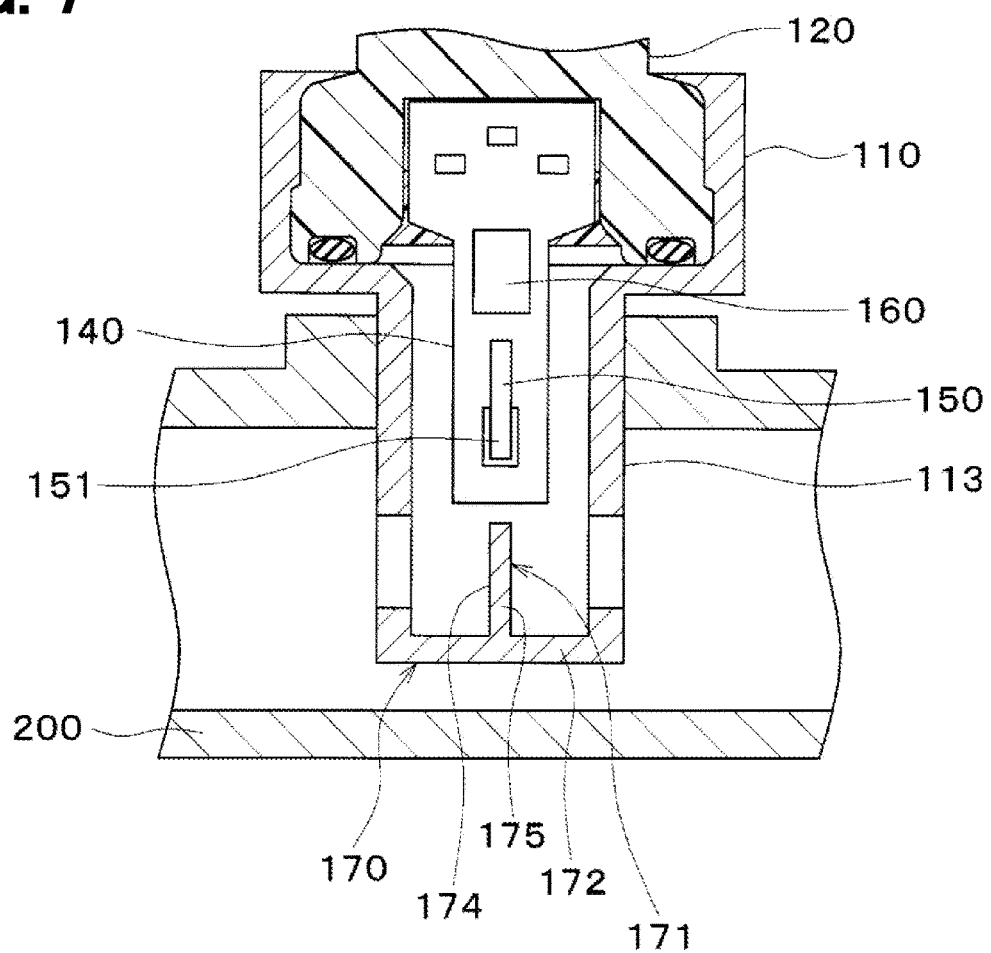
FIG. 7 is a cross-sectional view in which a housing and an introduction portion are integrated as a modified example of the first embodiment.

As a modification, as shown in FIG. 7, the introduction portion 170 may be integrated with the housing 110. For example, the introduction portion 170 is formed as a part of the tube 113. According to this, the number of parts can be reduced. Further, the introduction portion 170 may be made of the same material as the housing 110.

Figure 8:
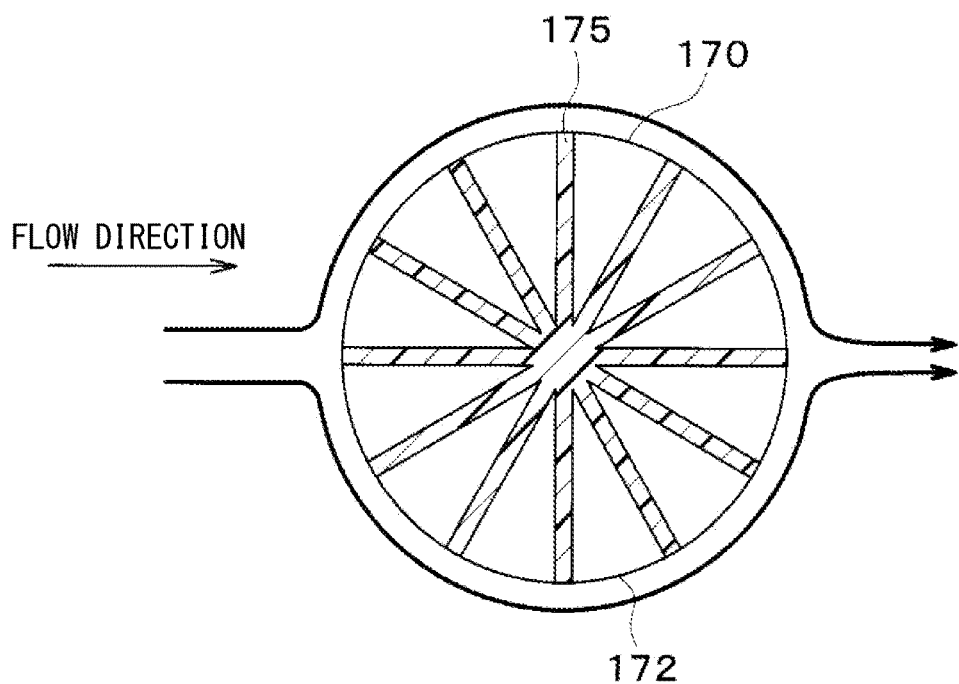
FIG. 8 is a cross-sectional view when 12 blades are used as a modified example of the first embodiment.

As a modification, as shown in FIG. 8, 12 blades 175 may be provided. By increasing the number of blades 175, the introduction portion 170 can be made to have a pseudo-cylindrical shape. As a result, the measuring medium flows smoothly from the upstream side to the downstream side of the introduction portion 170, so that the effect of reducing the pressure loss of the measuring medium can be enhanced.

Figure 9:
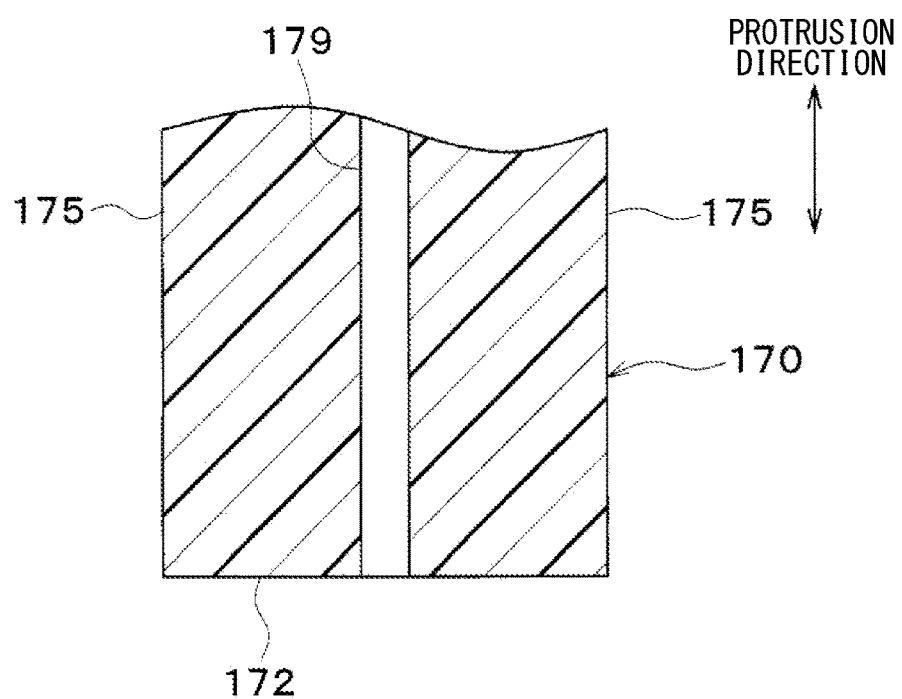
FIG. 9 is a cross-sectional view showing a through hole provided in the introduction portion as a modified example of the first embodiment.

As a modification, as shown in FIG. 9, the introduction portion 170 may have a through hole 179 formed in a joint portion of the respective blades 175 to extend along the protrusion direction. According to this, the measuring medium can be drawn into the tube 113 through the through hole 179 due to the pressure difference between the outside of the introduction portion 170 and the inside of the tube 113.

Figure 10:
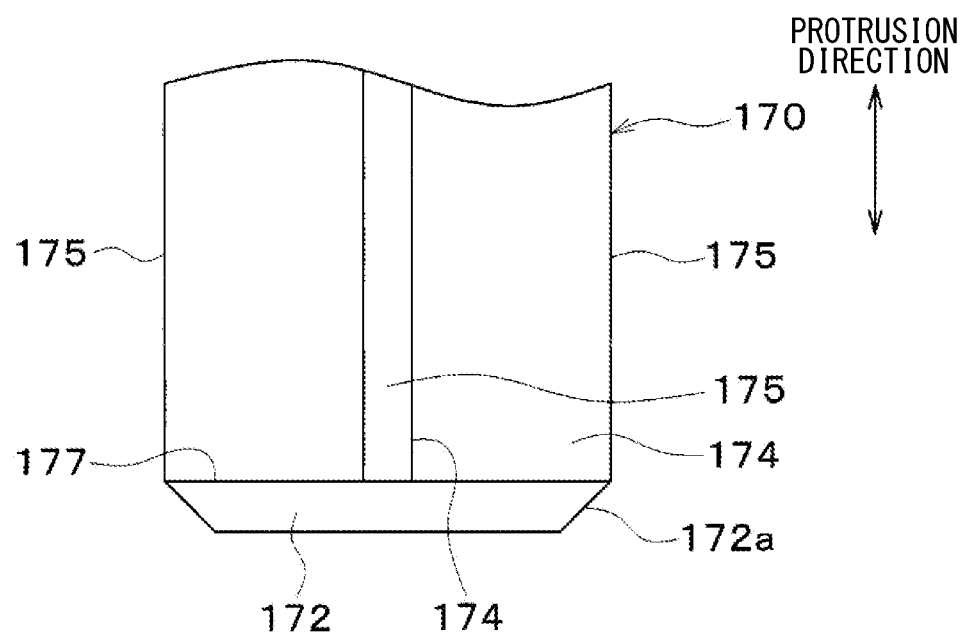
FIG. 10 is a side view showing a bottom having a tapered side surface as a modified example of the first embodiment.

As a modification, as shown in FIG. 10, the side surface 172a of the bottom 172 may be formed in a tapered shape.

Figure 11:
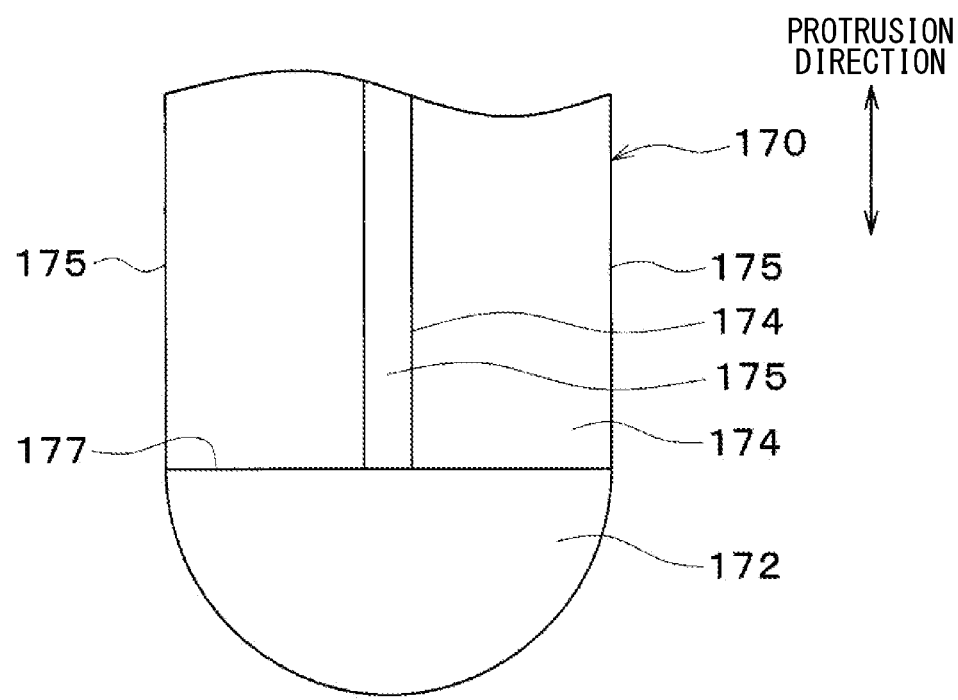
FIG. 11 is a side view showing a hemispherical bottom as a modified example of the first embodiment.

In this case, the entire side surface 172a may be a tapered surface, or a part of the side surface 172a may be a tapered surface. Further, as shown in FIG. 11, the bottom 172 may be formed in a hemispherical shape. As a result, the flow of the measuring medium becomes smooth along the tapered surface and the hemisphere surface of the bottom 172, so that the pressure loss of the measuring medium can be effectively reduced.

Second Embodiment

Figure 12:
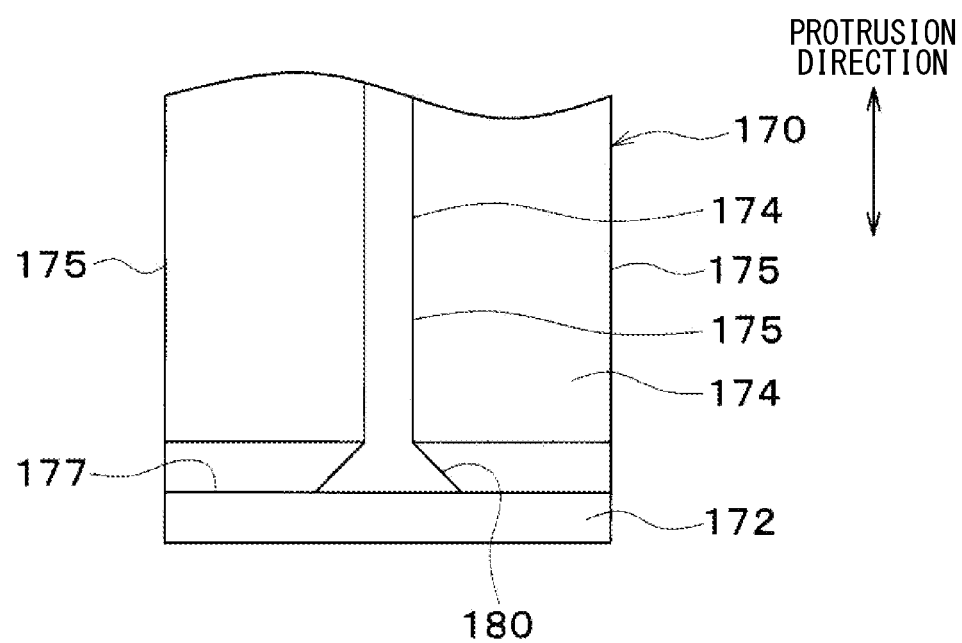
FIG. 12 is a side view of an introduction portion according to a second embodiment.

In the present embodiment, configurations different from those of the first embodiment will be described. As shown in FIG. 12, the introduction portion 170 has a flat tapered surface 180. The blade surfaces 174 of the blade s175 and a fixing surface 177 of the bottom 172 are connected by a tapered surface 180. As a result, the measuring medium that enters the acute-angled portion formed by the adjacent blades 175 can be easily moved to the sensor chip 150 along the tapered surface 180.

Figure 13:
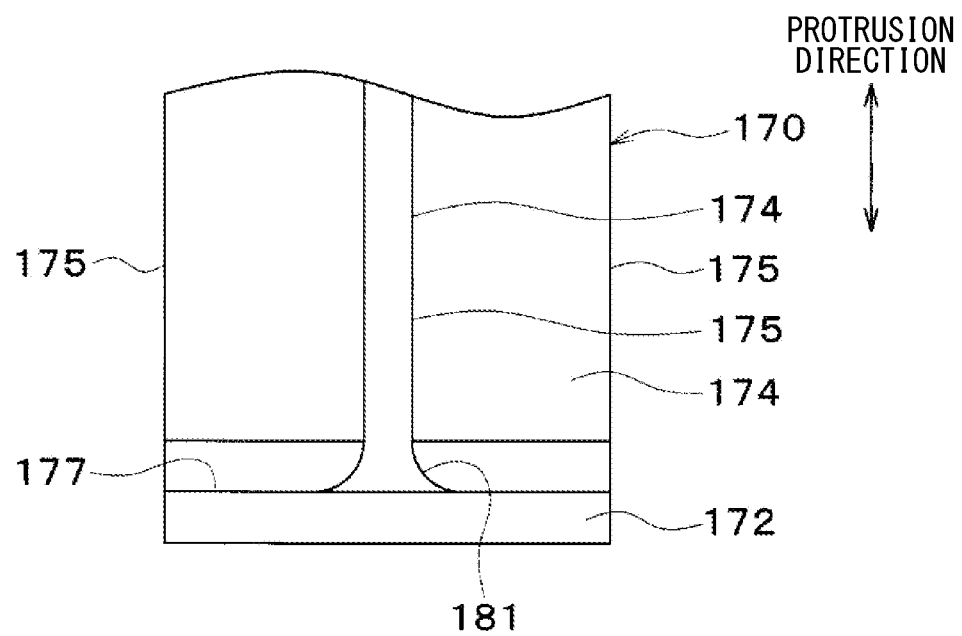
FIG. 13 is a side view showing an introduction portion according to a modified example of the second embodiment.

As a modification, as shown in FIG. 13, the introduction portion 170 may have a curved surface 181. The curved surface 181 is a curved surface recessed on a connection corner between the blade surface 174 of the blade 175 and the fixing surface 177 of the bottom 172.

The present disclosure is not limited to the embodiments described above, and various modifications can be made as follows within a scope not departing from the spirit of the present disclosure.

For example, the blades 175 may not be arranged at equal angles in the circumferential direction, but may be arranged at unequal angles in the circumferential direction.

Although a plurality of piezoresistive elements 152 are configured to detect both pressure and temperature, the piezoresistive element 152 that detects pressure and the piezoresistive element 152 that detects temperature may be configured separately. Further, as a means for detecting the pressure, a capacitive pressure detecting element may be adopted. Further, a thermistor or a thermocouple may be adopted as a means for detecting the temperature. In this case, a capacitive pressure detection element corresponds to a pressure detection unit, and a thermistor or a thermocouple corresponds to a temperature detection unit. That is, the pressure detection unit and the temperature detection unit may be separately provided on the sensor chip 150.

The electrical connection component between the circuit chip 160 and the sensor chip 150 is not limited to the lead frame 143. For example, the circuit chip 160 and the sensor chip 150 may be mounted on a printed circuit board.

The pressure/temperature sensor 100 may be configured not to include the molded resin portion 140. In this case, the pressure detection unit and the temperature detection unit constituting the sensor are held by parts such as the housing 110, the sensor body 120, and the potting unit 130.

Although the present disclosure has been described in accordance with the embodiments, it is understood that the present disclosure is not limited to the embodiments and structures disclosed therein. The present disclosure also includes various modifications and variations within an equivalent range. In addition, while the various combinations and configurations, which are preferred, other combinations and configurations, including more, less or only a single element, are also within the spirit and scope of the present disclosure.

What is claimed is:

1. A pressure/temperature sensor comprising:
a sensor circuit including a pressure detection unit configured to detect a pressure of a measuring medium, and a temperature detection unit configured to detect a temperature of the measuring medium;
a holding member having a tube, the holding member being configured to hold the sensor circuit to be positioned inside the tube, and to fix the sensor circuit to a pipe to which the tube is attached; and
an introduction portion provided in the holding member to be positioned at an inner side of the pipe with respect to the sensor circuit, and arranged inside the pipe when the tube is fixed to the pipe, wherein
the introduction portion includes a plurality of blades having blade surfaces extending along a protrusion direction of the introduction portion with respect to the sensor circuit, and
the plurality of blades are arranged radially on a perpendicular surface perpendicular to the protrusion direction, and angles defined by the blade surfaces of the adjacent blades are all acute angles.

2. The pressure/temperature sensor according to claim 1, wherein
the plurality of blades are five or more blades.

3. The pressure/temperature sensor according to claim 1, wherein
the plurality of blades are six blades.

4. The pressure/temperature sensor according to claim 1, wherein
the plurality of blades are eight blades.

5. The pressure/temperature sensor according to claim 1, wherein
the plurality of blades of the introduction portion includes a bottom fixed on a side opposite to the sensor circuit in the protrusion direction.

6. The pressure/temperature sensor according to claim 5, wherein
the bottom has a fixing surface at which the plurality of blades are fixed, and
the blade surface and the fixing surface are connected by a flat tapered surface, or are connected by a curved surface recessed at a connection corner between the blade surface and the fixing surface.

7. The pressure/temperature sensor according to claim 1, wherein
the introduction portion is a part of the holding member.

8. The pressure/temperature sensor according to claim 1, further comprising
a molded resin portion to which the sensor circuit is fixed to expose a part of the sensor circuit, corresponding to the pressure detection unit and the temperature detection unit, wherein
the pressure detection unit is configured by a piezoresistive element in which a resistance value changes according to the pressure of the measuring medium, and
the temperature detection unit is configured by a piezoresistive element in which a resistance value changes according to the temperature of the measuring medium.

9. The pressure/temperature sensor according to claim 1, wherein
the measuring medium is a gas.

10. A pressure/temperature sensor comprising:
a sensor circuit configured to detect a pressure of a measuring medium and a temperature of the measuring medium in a pipe;
a holding member having a tube protruding in a protrusion direction, the holding member being configured to hold the sensor circuit to be positioned inside the tube, and to fix the sensor circuit to the pipe to which the tube is attached; and a plurality of blades arranged in one end of the tube having an introduction port from which the measuring medium in the pipe is introduced, wherein the plurality of blades are arranged radially on a surface perpendicular to the protrusion direction of the tube, and angles defined by blade surfaces of the adjacent blades are all acute angles, and the plurality of blades are fixed at the one end of the tube.

11. The pressure/temperature sensor according to claim 10, wherein the tube has a flow passage through which the measuring medium introduced from the introduction port flows toward the sensor chip, the plurality of blades includes upstream side blades facing to a flow direction of the measuring medium in the pipe, and the flow passage of the tube is defined by the upstream side blades having blade surfaces extending along the protrusion direction of the tube.

\* \* \* \* \*